United States Patent
Ladell et al.

(10) Patent No.: US 6,394,533 B1
(45) Date of Patent: May 28, 2002

(54) FIFTH WHEEL VEHICLE TRAILER

(75) Inventors: Scott Ladell, Ilderton; Terry Mullan, London; Peter Bruijns, Strathroy, all of (CA)

(73) Assignee: Glendale Recreational Vehicles, Inc., Strathroy (CA)

( * ) Notice: Subject to any disclaimer, the term of this patent is extended or adjusted under 35 U.S.C. 154(b) by 0 days.

(21) Appl. No.: 09/722,408

(22) Filed: Nov. 28, 2000

(30) Foreign Application Priority Data

Nov. 24, 2000 (CA) ............................................. 2326745

(51) Int. Cl.$^7$ ................................................. B60J 7/00
(52) U.S. Cl. ........................ 296/181; 296/165; 280/423
(58) Field of Search ................................ 296/181, 165, 296/37.6, 168, 172, 173, 26.13; 280/423.1, 433, 417.1, 476.1, 491.1, 424

(56) References Cited

U.S. PATENT DOCUMENTS

| | | | | |
|---|---|---|---|---|
| 3,390,896 A | | 7/1968 | Philapy ...................... 280/423 |
| 3,770,297 A | * | 11/1973 | Quick ......................... 280/423 |
| 3,790,189 A | * | 2/1974 | Winter ........................ 280/423 |
| 3,801,138 A | * | 4/1974 | Quick ......................... 280/423 |
| 3,811,707 A | * | 5/1974 | Jeambey ...................... 280/423 |
| 3,817,545 A | | 6/1974 | Ward ........................... 280/34 |
| 3,843,158 A | * | 10/1974 | Schwellenbach ............. 280/423 |
| 3,887,220 A | * | 6/1975 | Hall ............................ 280/423 |
| 3,893,711 A | * | 7/1975 | Goodwin ..................... 280/423 |
| 4,085,959 A | * | 4/1978 | Dimick ........................ 296/23 |
| 4,127,299 A | * | 11/1978 | Blair ........................... 296/23 |
| 4,256,323 A | * | 3/1981 | McBride ...................... 280/423 |
| 4,440,433 A | * | 4/1984 | Williams et al. .............. 296/91 |
| 4,995,664 A | * | 2/1991 | Buday ......................... 296/165 |
| 5,180,205 A | * | 1/1993 | Shoop ......................... 296/181 |
| 5,387,002 A | * | 2/1995 | Grevich ....................... 296/168 |
| 5,513,894 A | * | 5/1996 | Ragsdale ................... 296/180.2 |
| 5,566,963 A | * | 10/1996 | Johnson ...................... 280/433 |
| 5,890,728 A | * | 4/1999 | Zilm ........................... 280/433 |
| 5,931,519 A | * | 8/1999 | Jeffers et al. .............. 296/57.1 |
| 6,290,284 B1 | * | 9/2001 | Creaan ....................... 296/168 |

FOREIGN PATENT DOCUMENTS

DE          3527542 A1  *  2/1987

* cited by examiner

*Primary Examiner*—Ken Patel
(74) *Attorney, Agent, or Firm*—Dimock Stratton Clarizio; Mark B. Eisen

(57) ABSTRACT

A fifth wheel trailer for hitching to a truck by a fifth wheel hitch in a towing bed of the truck wherein a front section of the trailer extends over a cab of the truck when the trailer is coupled to and supported by the fifth wheel hitch. The front section of the trailer comprises a first section extending over the towing bed of the truck and a second section extending over the cab of the truck.

10 Claims, 16 Drawing Sheets

Current Model

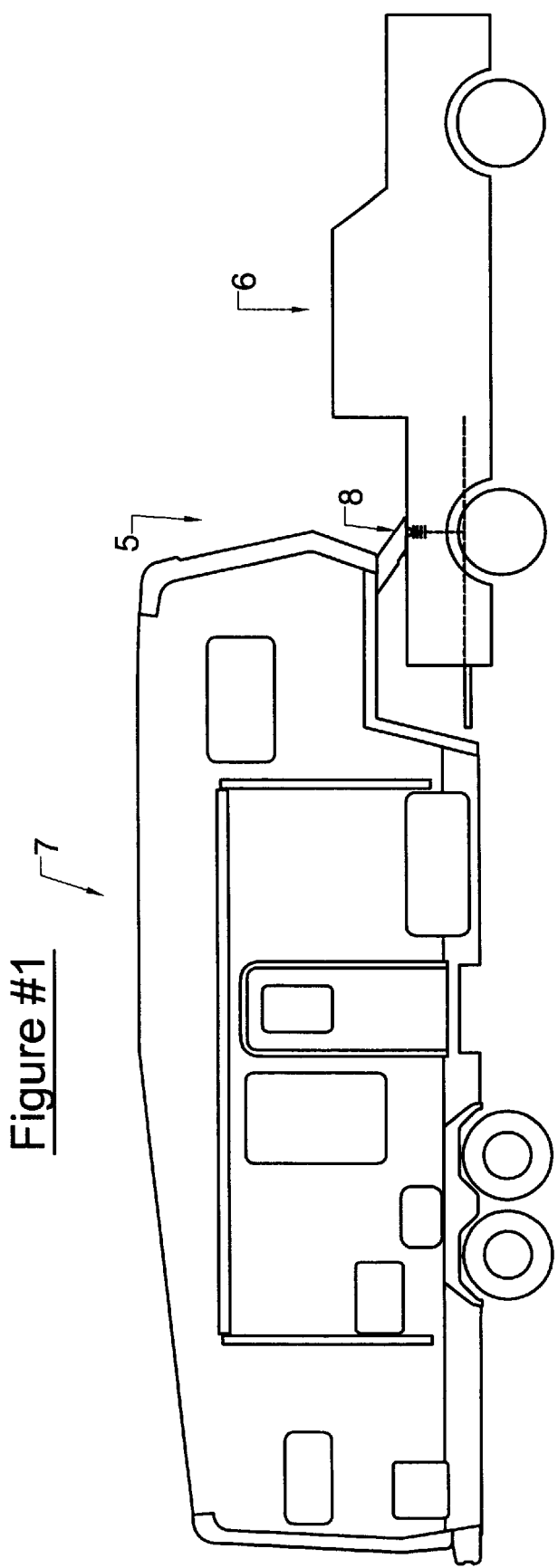

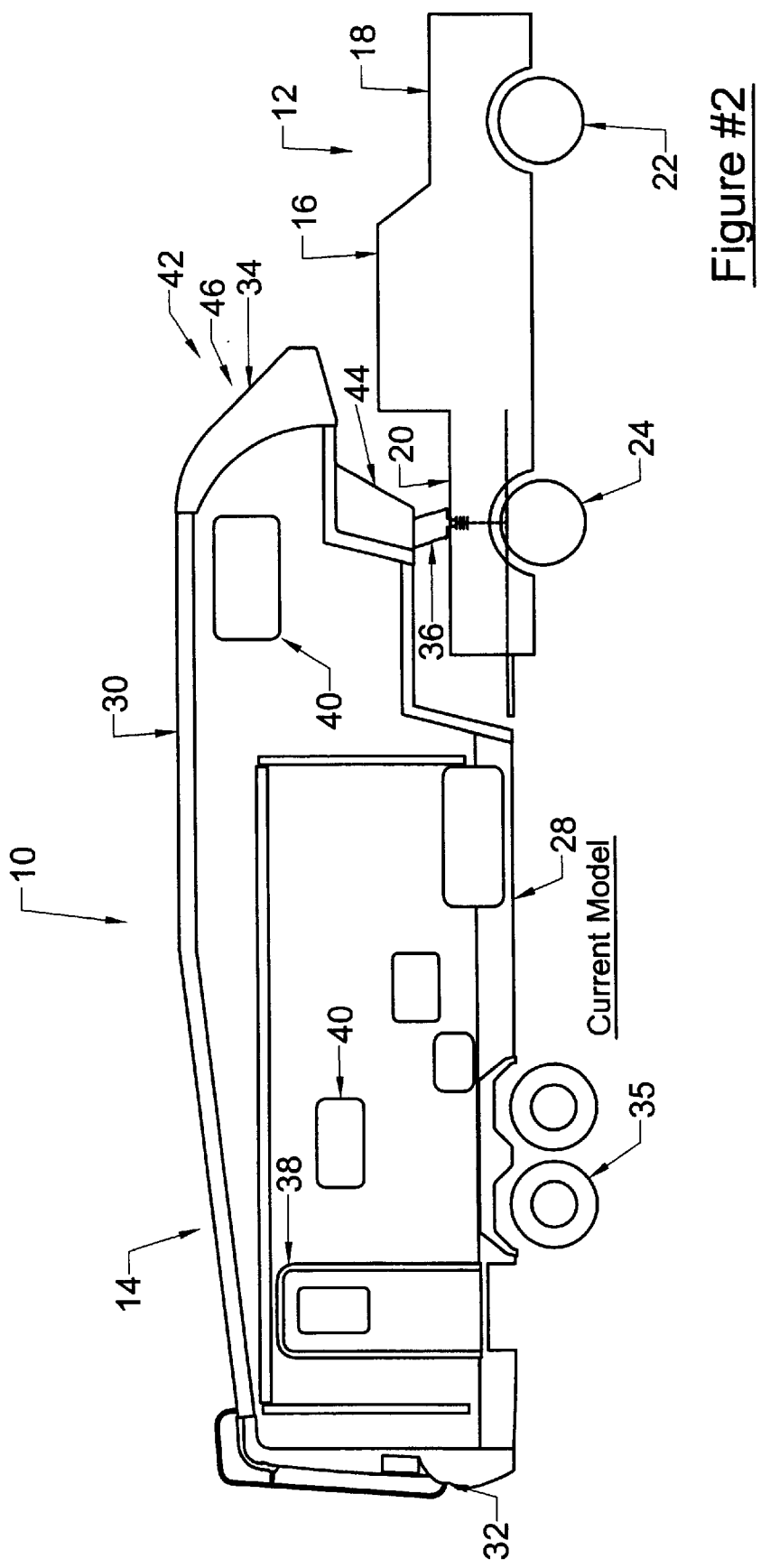
Figure #2

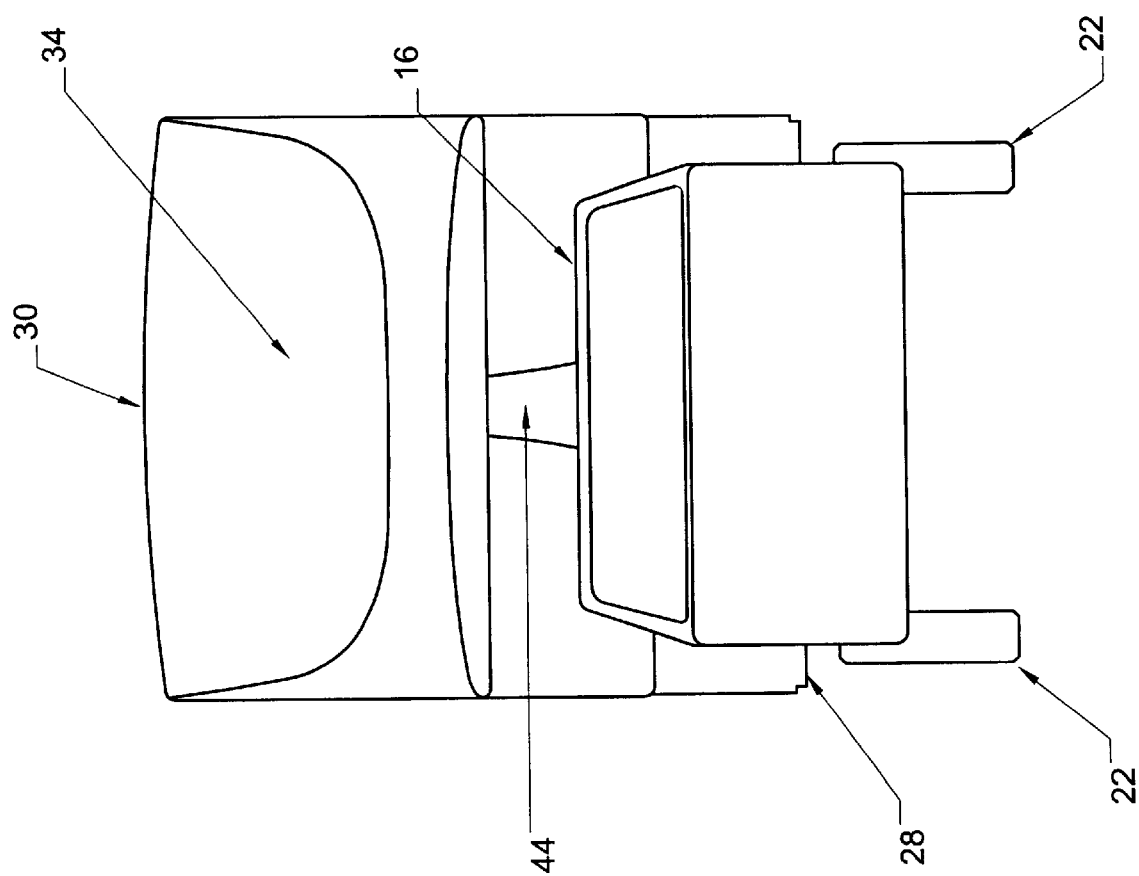

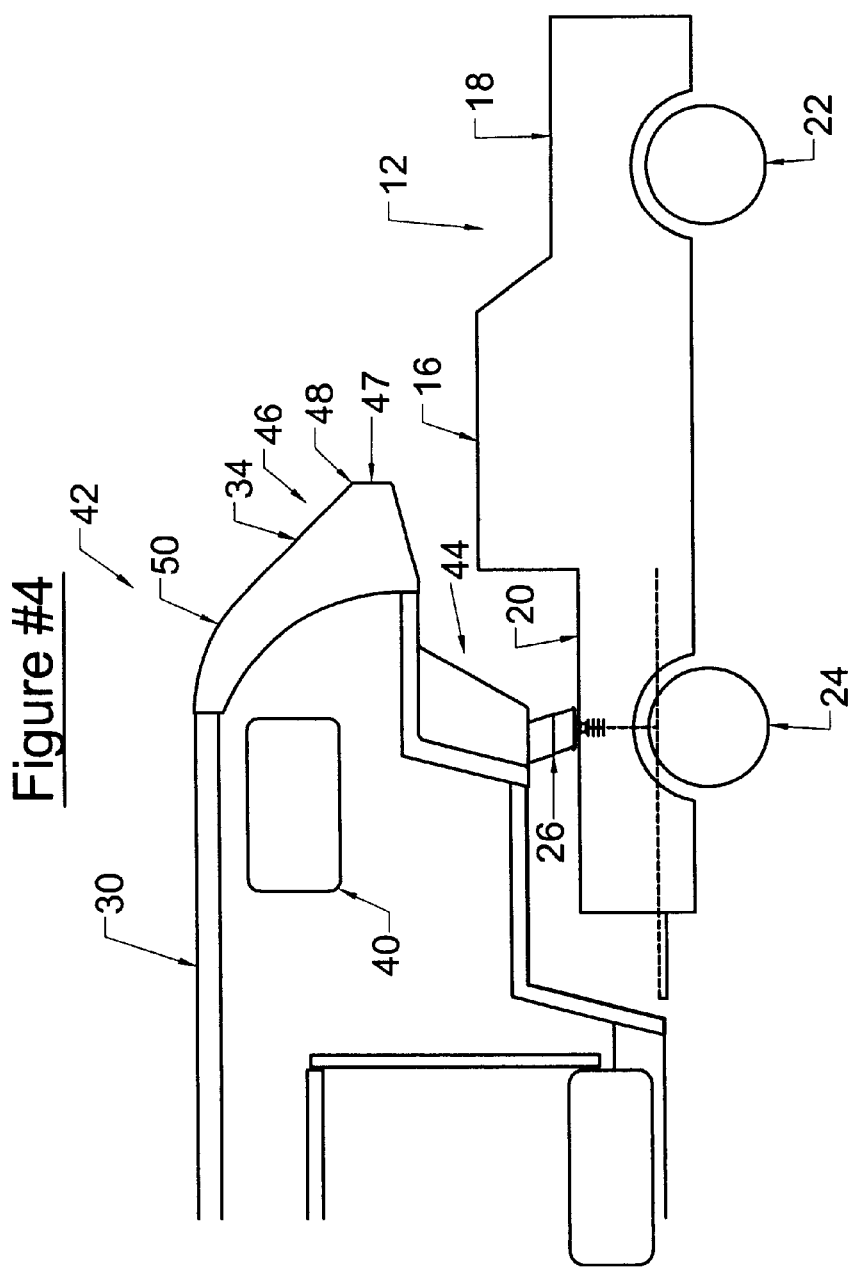
Figure #4

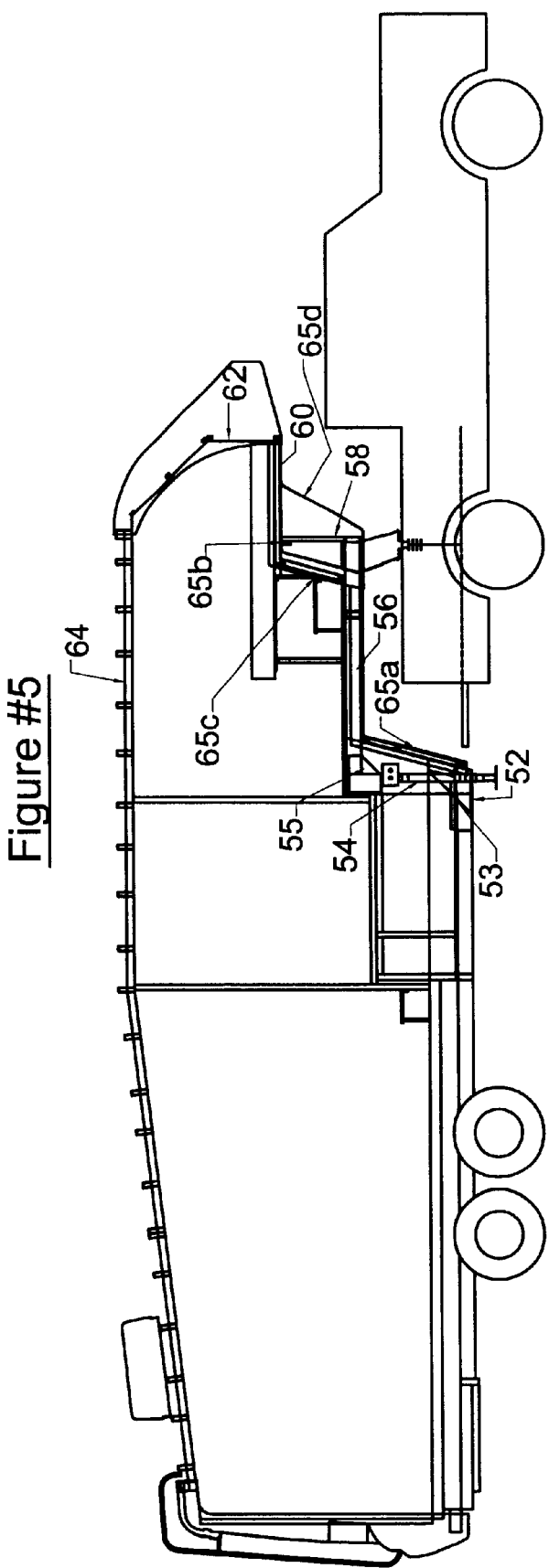

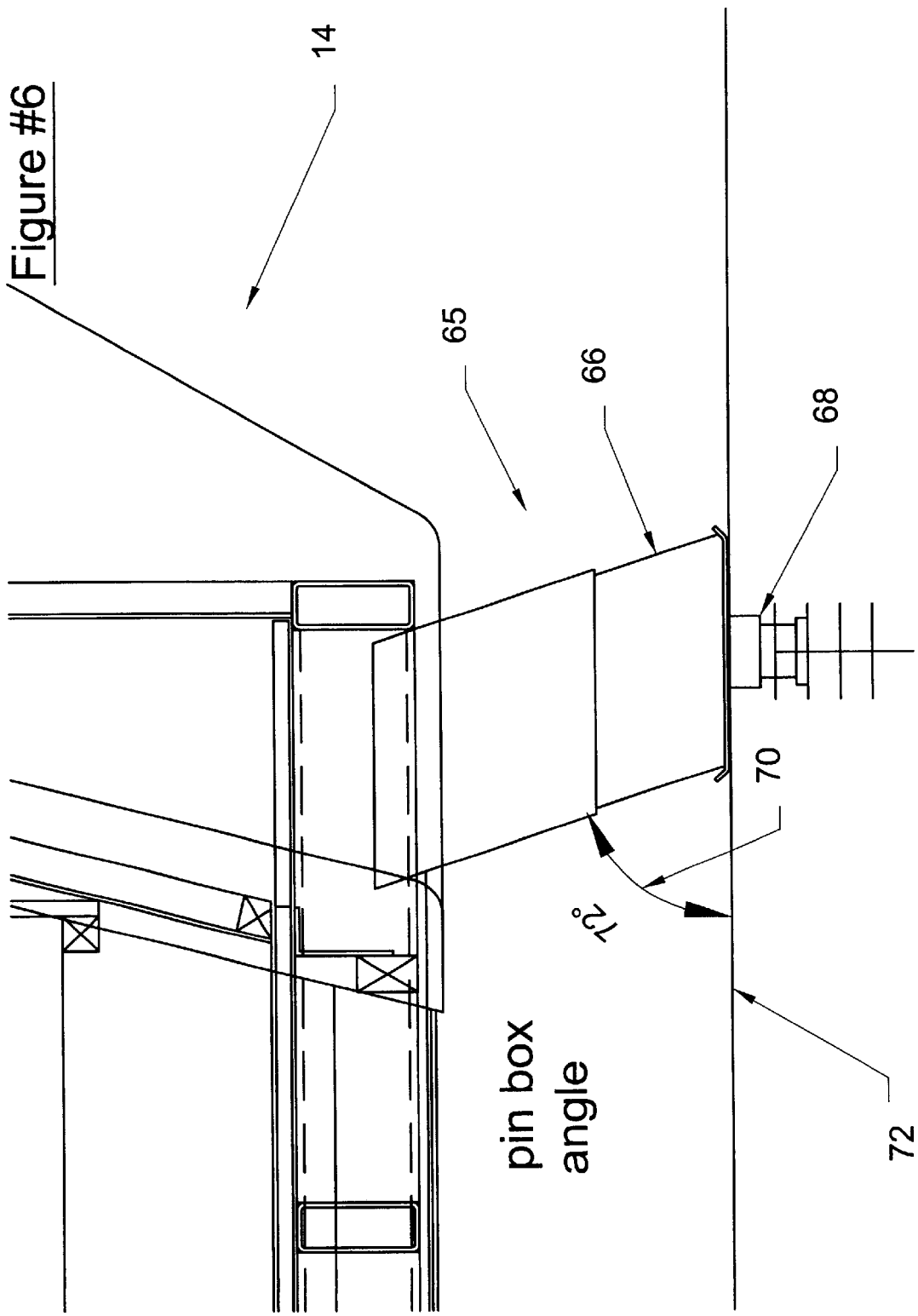

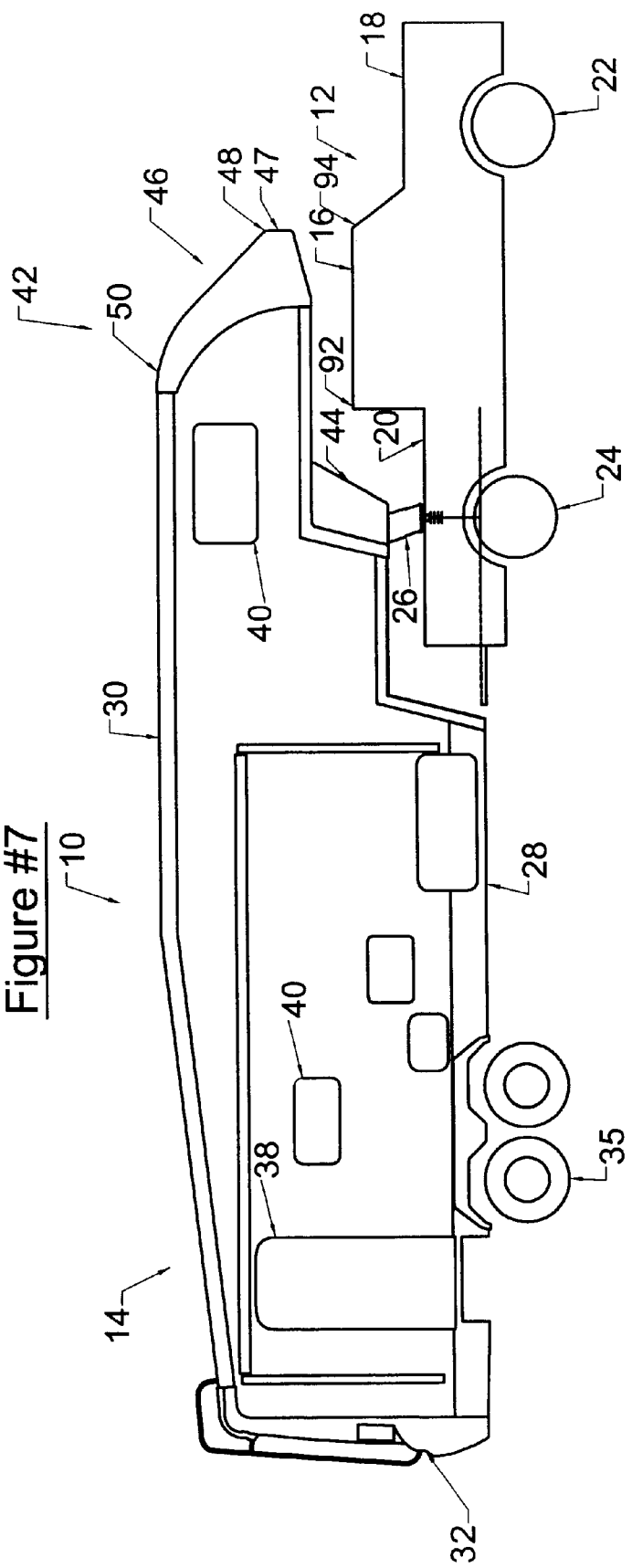

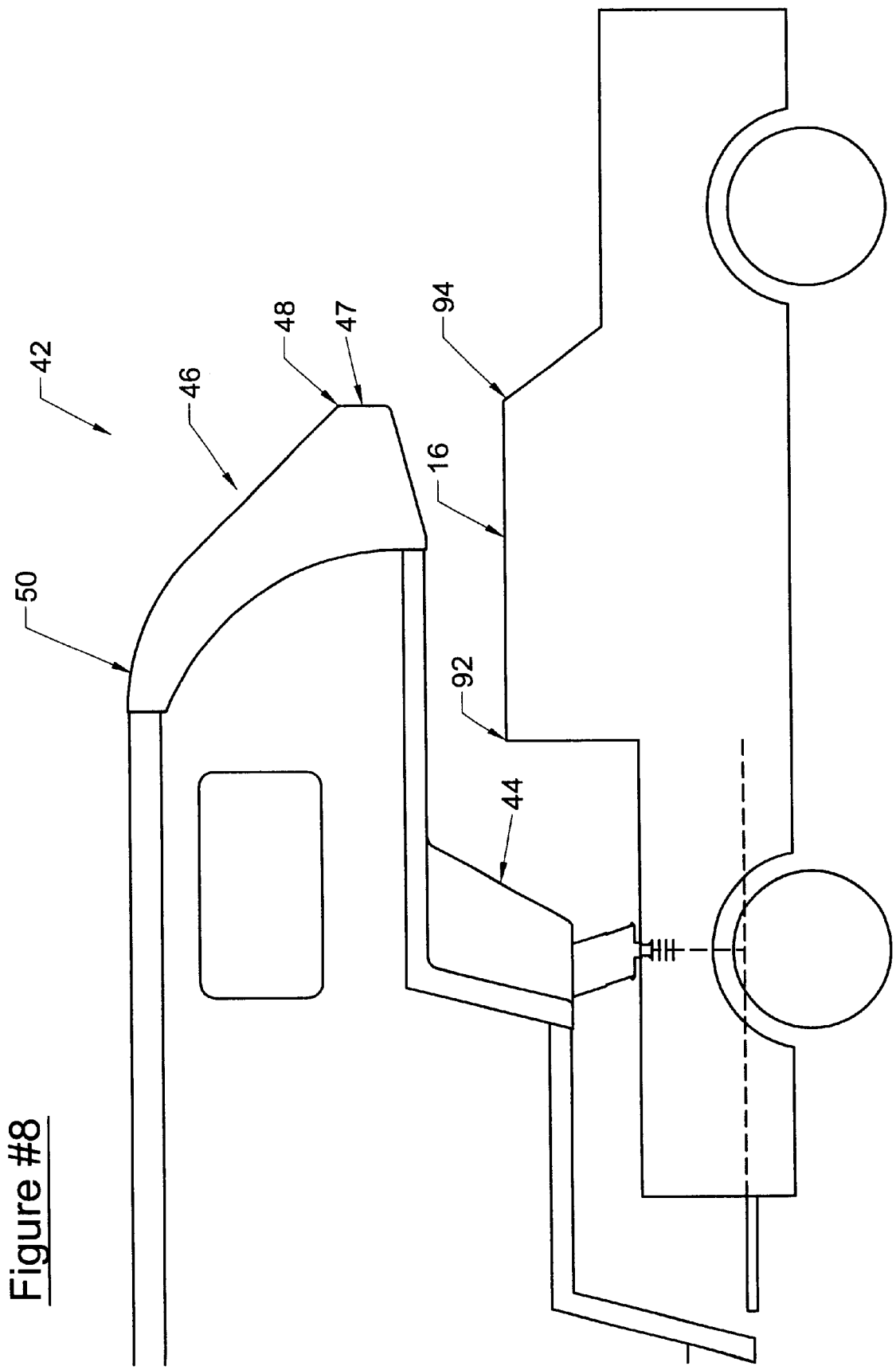
Figure #8

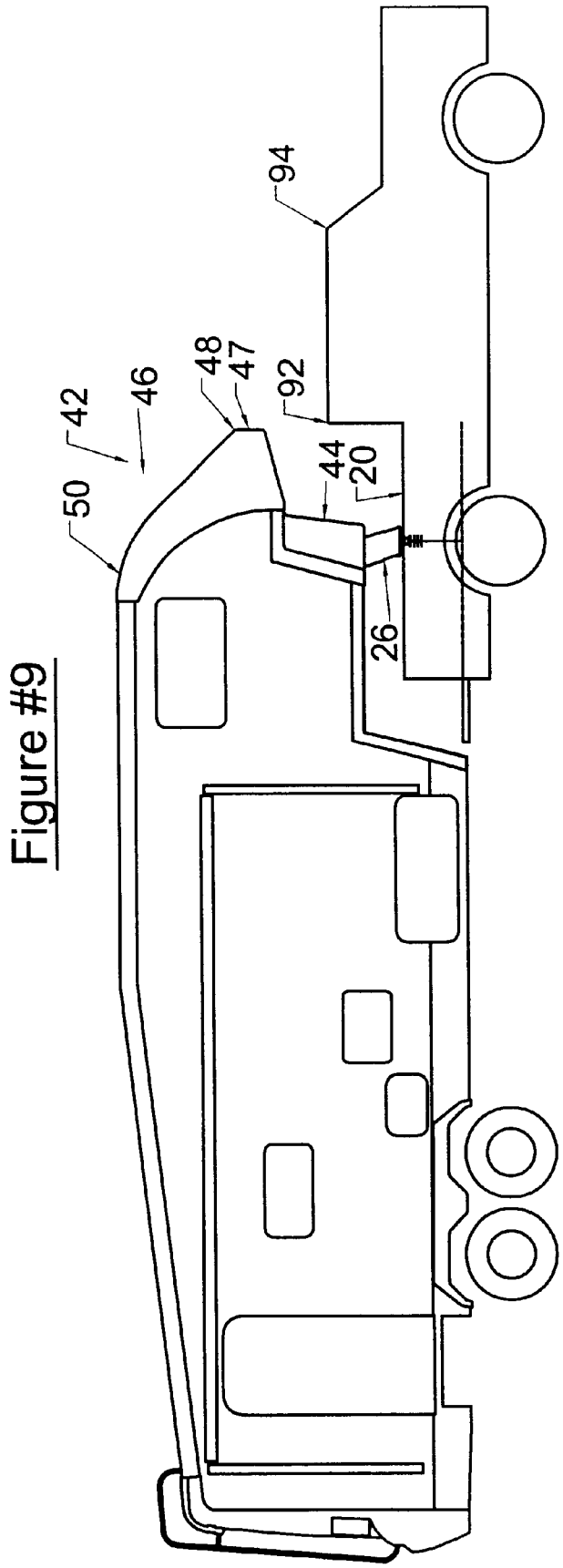

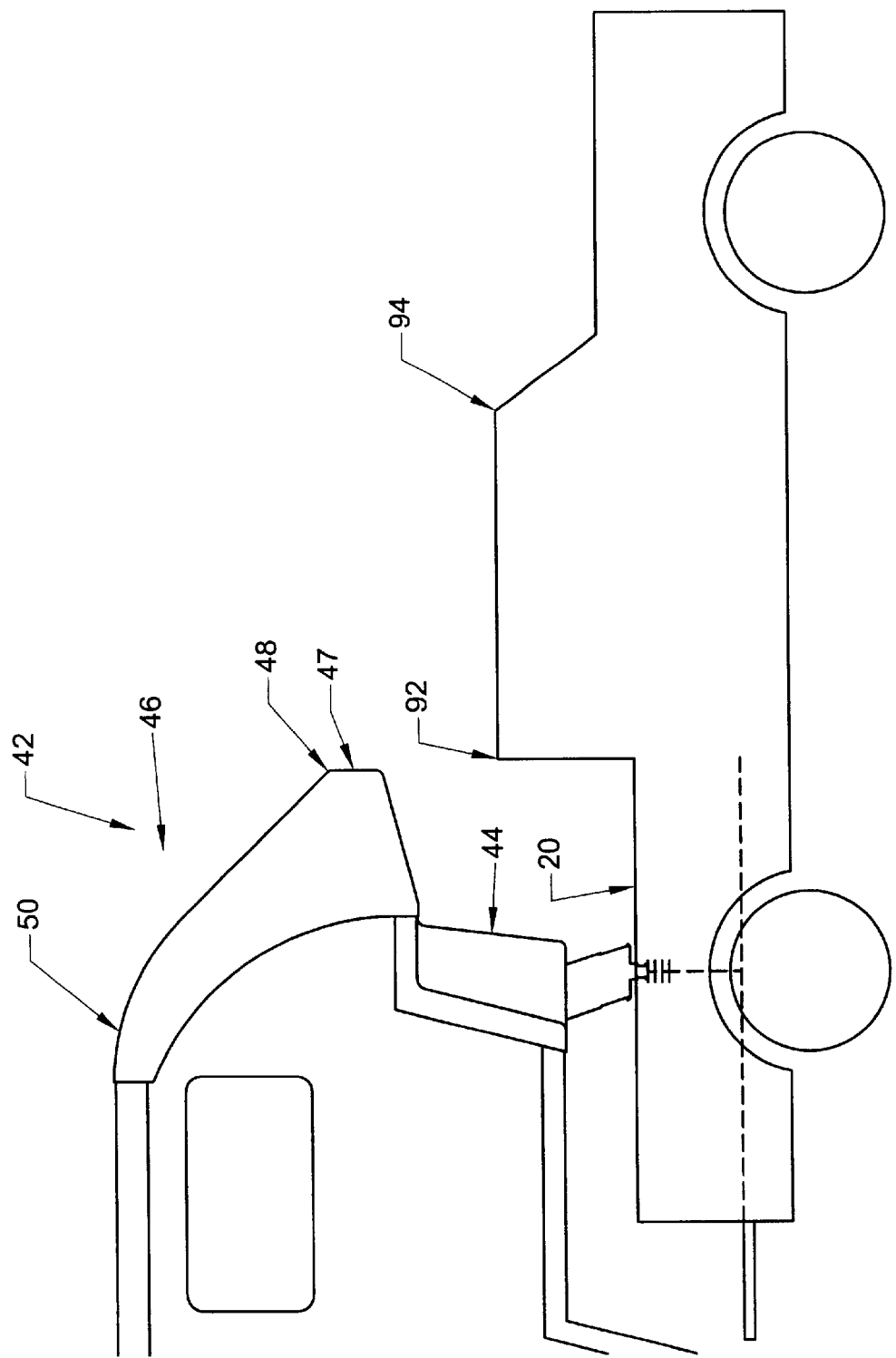
Figure #10

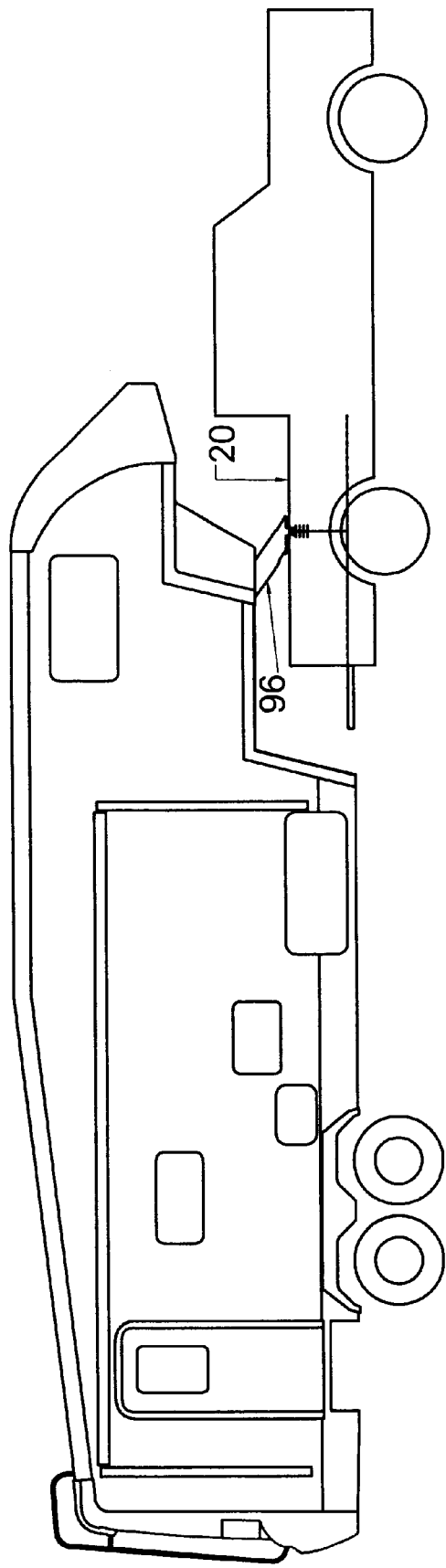

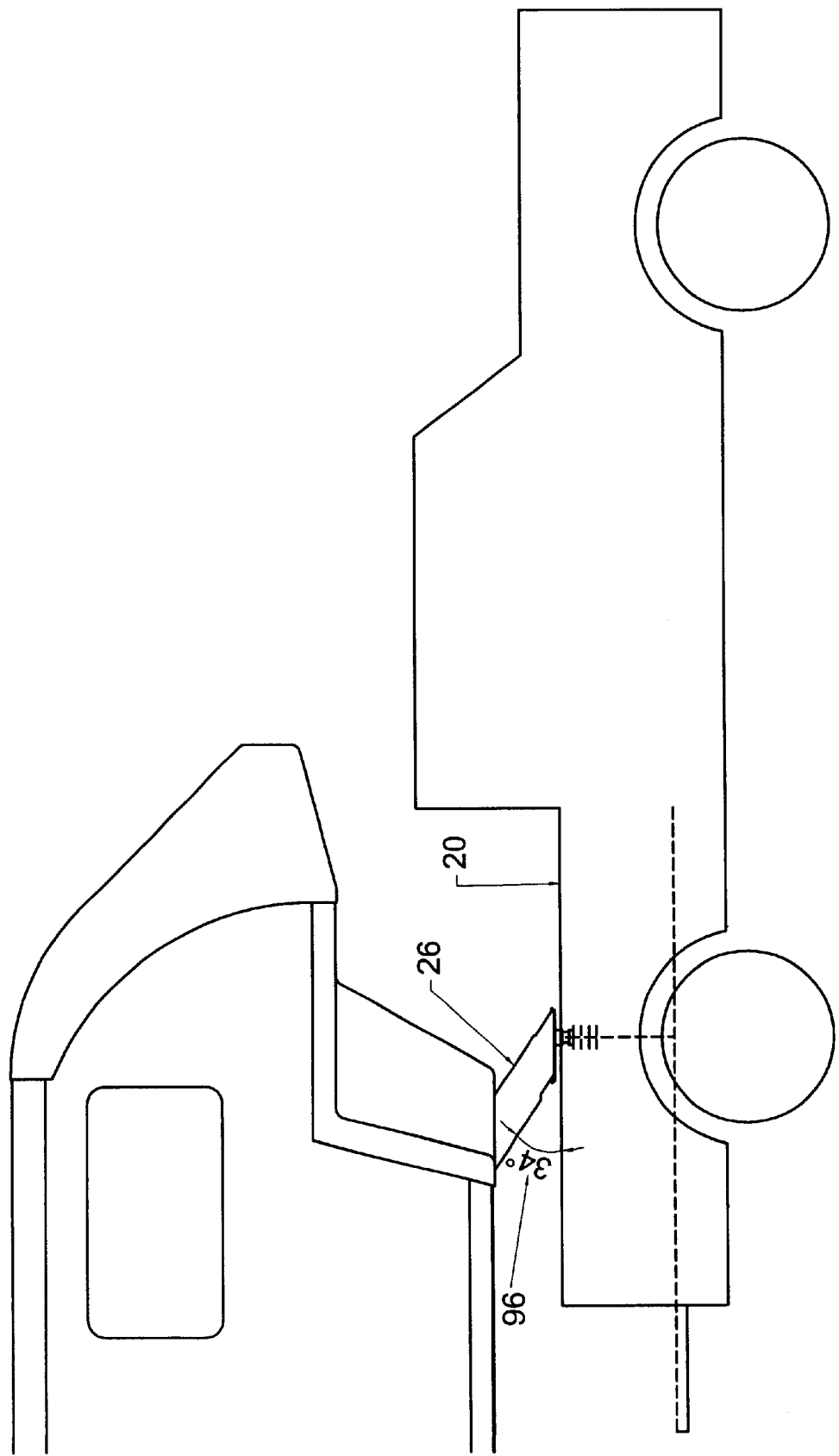
Figure #12

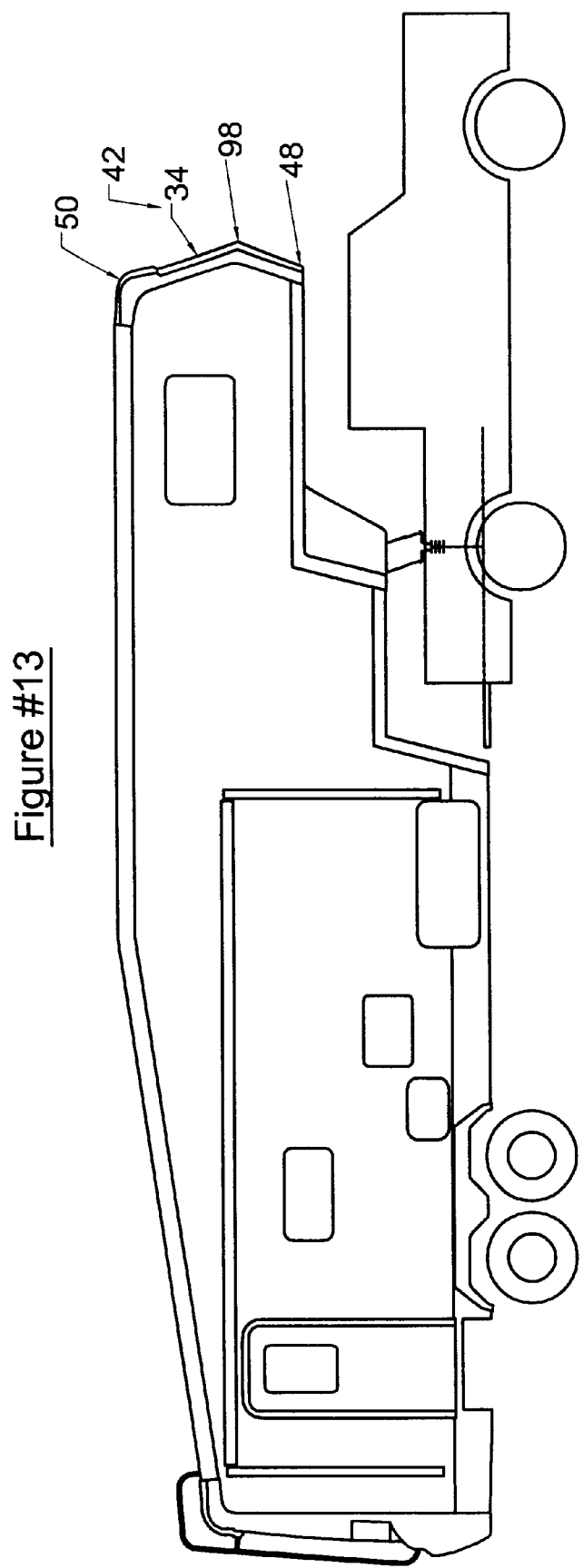
Figure #13

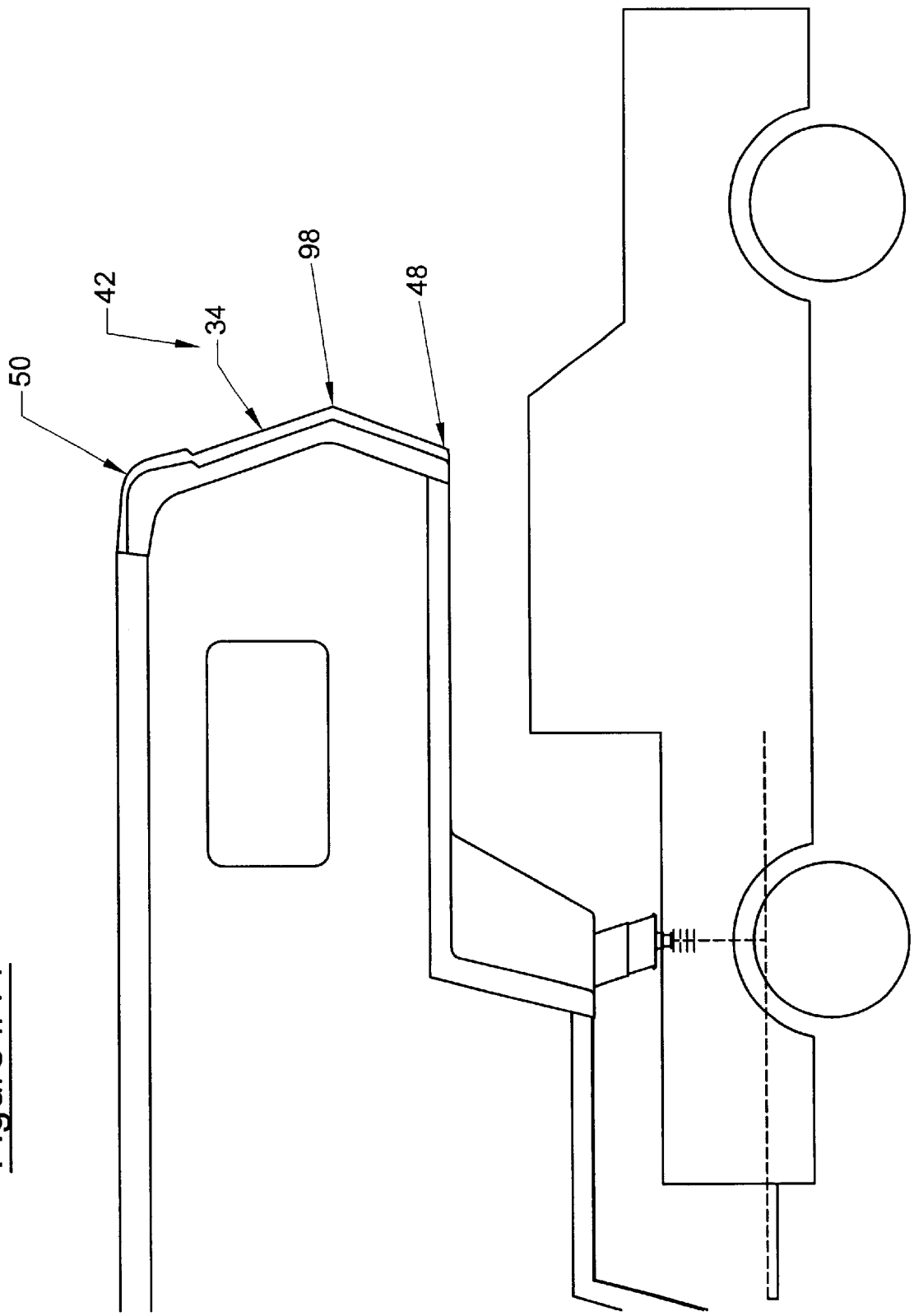
Figure #14

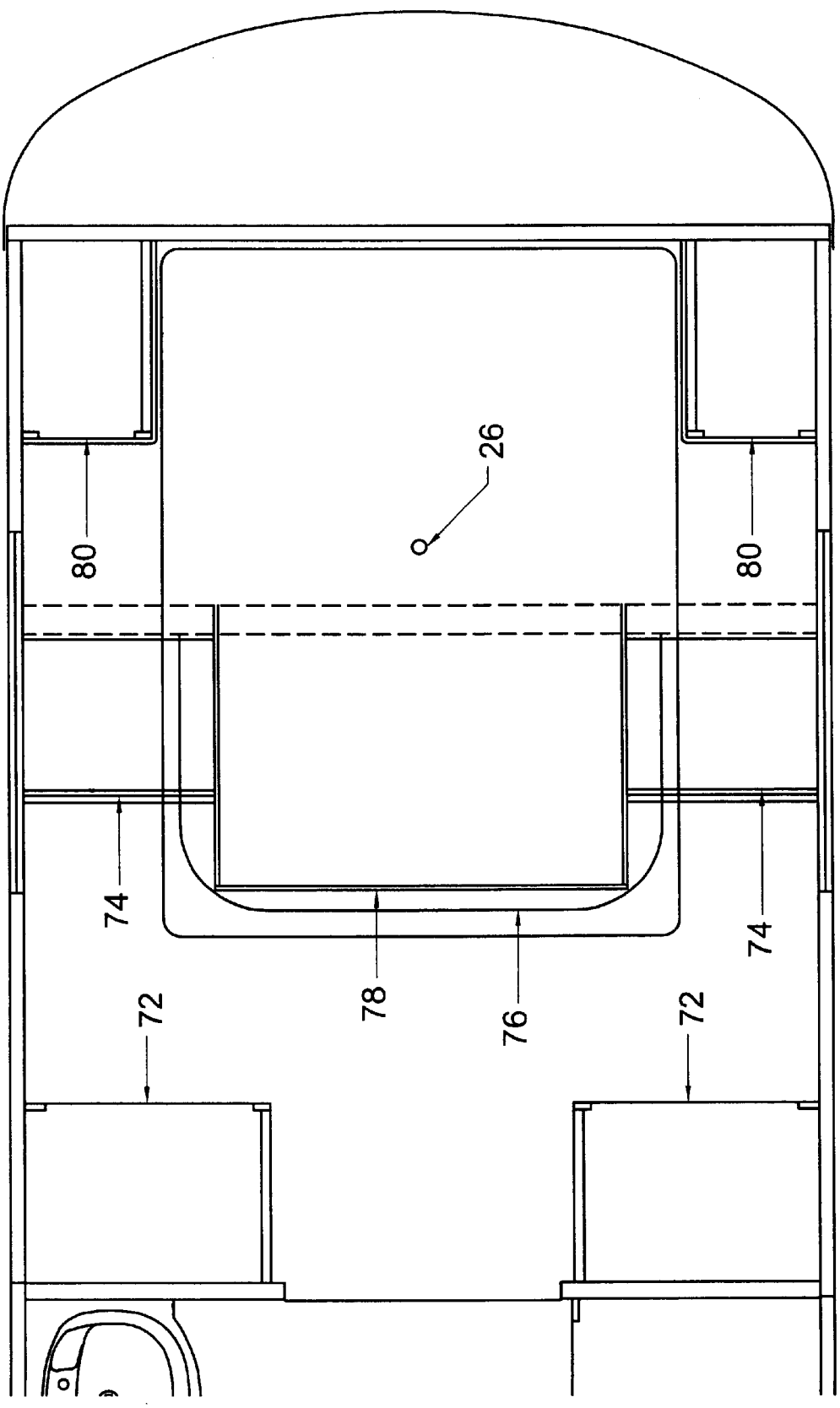

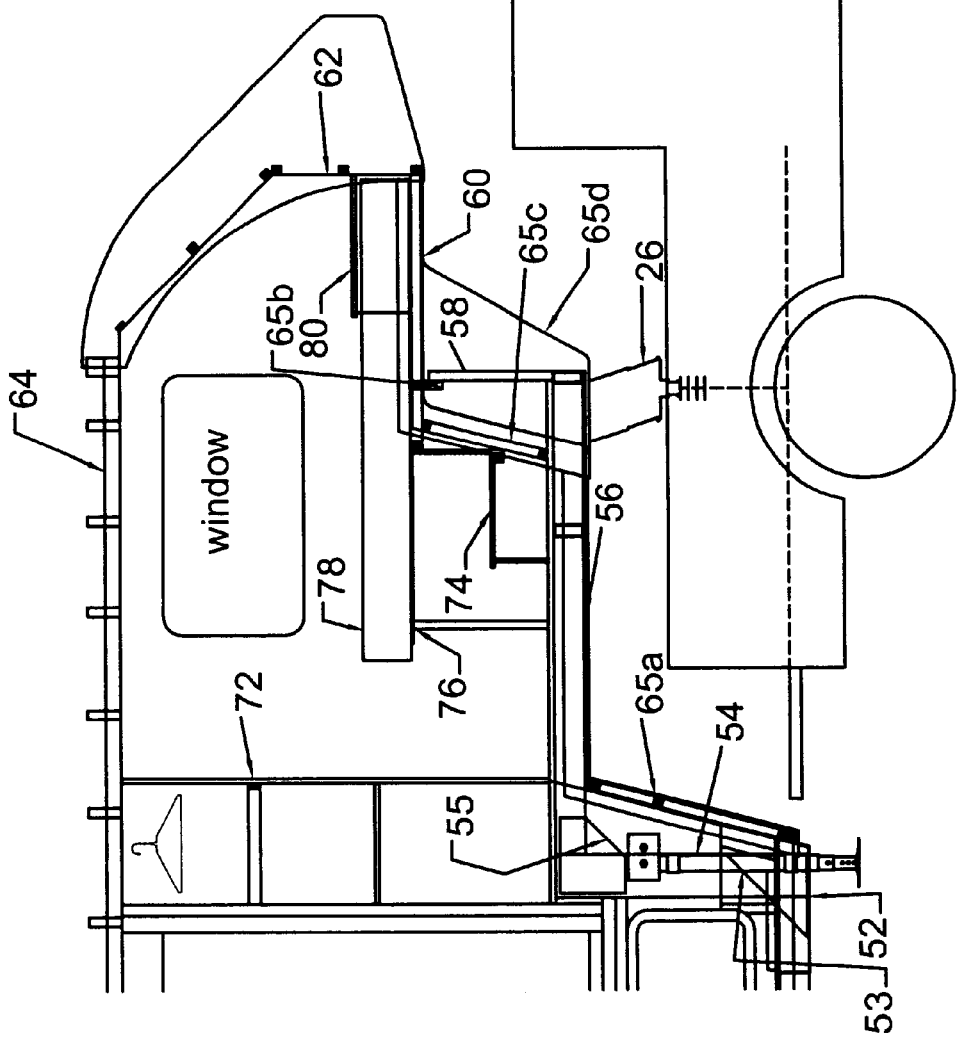
Figure #16

FIFTH WHEEL VEHICLE TRAILER

FIELD OF THE INVENTION

This invention relates to an improvement in a fifth wheel vehicle trailer.

BACKGROUND OF THE INVENTION

Fifth wheel trailers are trailers which are hitched to a bed of a towing vehicle rather than hitched to a rear bumper of a towing vehicle.

Currently, fifth wheel trailers sometimes include a bedroom slide-out whereby additional floor space can be created when the fifth wheel trailer is in a parked position. However, there are electromechanical devices required to operate the side bedroom slide which can be cumbersome and can result in significant service and maintenance costs. In addition, is it possible for water and air to leak into the fifth wheel trailer through the side bedroom slide.

Ward in U.S. Pat. No. 3,817,545 discloses a vehicle having a power unit and a housing removeably mounted with a break-open hitch assembly on the power unit. The power unit has an open top body that is covered by the housing. The front portion of the housing has an opening providing access between the interior of the housing and the driver-passenger compartment of the power unit, permitting concurrent use of the housing and the driver-passenger compartment. However, Ward requires modifications to the towing vehicle which could make it difficult to retrofit the housing to existing power units. In addition, Ward teaches that the front portion of the housing which extends over the power unit is connected to and supported by the cab of the towing vehicle.

Shoop in U.S. Pat. No. 5,180,205 teaches the addition of a tapered, streamlined aerodynamic extension to a front end of the trailer which can be retrofitted to existing trailers to provide extra storage and sleeping space. However, the extension in Shoop terminates behind the pick-up cab and is slightly lower than and narrower than the truck's cab and does therefore not extend over the cab of the towing vehicle. Access to the extension is available through a separate exterior access door as well as through the original front window opening of the trailer. While this design is useful for retrofitting to existing trailers, the additional space created is limited and is not as useful as if the additional space were part of the trailer itself and this design limits the placement of windows and other openings.

There remains a need for a fifth wheel trailer design which allows for the incorporation of significant additional living space without requiring a slide-out and without adding to the length between the hitch and a bumper of the towing vehicle.

SUMMARY OF THE INVENTION

It is an object of the invention to overcome the disadvantages of the prior art by providing, in accordance with one embodiment of the invention, a fifth wheel trailer for hitching to a truck, the truck having a cab and a fifth wheel hitch in a towing bed of the truck, a front section of the trailer extending over the cab of the truck when the trailer is coupled to and supported by the fifth wheel hitch.

In a further embodiment of the invention, the front section of the trailer comprises a first section extending over the towing bed of the truck and a second section extending over and forward from the first section, the second section extending over the cab of the truck.

In a further embodiment of the invention, the front section of the trailer comprises a lower frame; an upper frame; a first upright connecting the lower frame to a first end of the upper frame; a second upright extending upwards from a second end of the upper frame; and a floor panel supported by the second, load-bearing upright on one side, a front stiffener wall on a second side and sidewalls on a third and fourth side.

BRIEF DESCRIPTION OF THE DRAWINGS

In drawings which illustrate by way of example only a preferred embodiment of the invention, FIG. 1 is a side elevation view of a fifth wheel trailer and truck assembly of the prior art;

FIG. 2 is a side elevation view of a fifth wheel trailer and truck assembly according to a first embodiment of the present invention;

FIG. 3 is a front view of the fifth wheel trailer and truck assembly of FIG. 2;

FIG. 4 is a side view of a front section of the fifth wheel trailer and truck assembly of FIG. 2;

FIG. 5 is a side elevation view of the fifth wheel trailer of FIG. 2 depicting a frame of the front section of the fifth wheel trailer;

FIG. 6 is a side elevation view of a pinbox for hitching the fifth wheel trailer to the truck of FIG. 2;

FIG. 7 is a side elevation view of a fifth wheel trailer and truck assembly according to a further embodiment of the present invention;

FIG. 8 is a side elevation view of the front section of the fifth wheel trailer and truck assembly of FIG. 7;

FIG. 9 is a side elevation view of a fifth wheel trailer and truck assembly according to a further embodiment of the present invention;

FIG. 10 is a side elevation view of the front section of the fifth wheel trailer and truck assembly of FIG. 9;

FIG. 11 is a side elevation view of a fifth wheel trailer and truck assembly according to a further embodiment of the present invention;

FIG. 12 is a side elevation view of the front section of the fifth wheel trailer and truck assembly of FIG. 11;

FIG. 13 is a side elevation view of a fifth wheel trailer and truck assembly according to a further embodiment of the present invention;

FIG. 14 is a side elevation view of the front section of the fifth wheel trailer and truck assembly of FIG. 13;

FIG. 15 is a top elevation view of the front section of the fifth wheel trailer in one embodiment of the invention; and FIG. 16 is a side elevation view of the front section of the fifth wheel trailer of FIG. 15 depicting the frame of the front section.

DETAILED DESCRIPTION OF THE PREFERRED EMBODIMENTS

FIG. 1 is a side elevational view of a trailer assembly 5 of the prior art. The assembly 5 comprises a truck 6 and a trailer 7. The trailer 7 is hitched to the truck by a fifth wheel hitch 8. The trailer 6 does not extend significantly forward from the fifth wheel hitch 8.

As shown in FIG. 2, a fifth wheel trailer and truck assembly 10 of one embodiment of the invention is shown. The assembly 10 comprises a truck 12 and a fifth wheel vehicle trailer 14 (hereinafter referred to as the "trailer"). The truck 12 has a cab 16, a hood 18 enclosing a front engine portion, a towing bed 20, front wheels 22 and rear wheels 24.

The towing bed 20 includes a fifth wheel hitch (or pinbox) 26 generally positioned between or near the rear wheels 24 of the truck 12.

The trailer 14 has a floor 28, a roof 30, a rear wall 32, a front wall 34, a plurality of wheels 35, a door 38 and a plurality of windows 40. The trailer 14 can be of any length from front wall 34 to rear wall 32 provided that the length does not exceed any maximum limits prescribed by government regulations.

The trailer 14 has a front section 42 which, when hitched to the truck 12, extends over the towing bed 20 and the cab 16. The front section 42 comprises a first section 44 which extends over the towing bed 20 and a second section 46 which extends over and forward from the first section 44 and over the cab 16 of the truck 12. The front section 42 therefore provides additional square footage within the trailer 14 which can be used for various means including living room quarters, bedroom quarters, den space or storage space.

FIG. 3 depicts the fifth wheel trailer and truck assembly 10 of FIG. 1 from a front elevational view, including the front section 42 which extends over the cab 16 of the truck 12.

FIG. 4 is a side elevational view of the front section 42 of the trailer 14 of FIG. 2. The first section 44 and the second section 46 are shown, thereby creating a two-tiered front end 42 of the trailer 14. The front wall 34 comprises a fibreglass cap comprising a front face 47, a first portion 48 closest to the cab 16 and a second portion 50 closest to the roof 30 of the trailer 14. The front wall 34 is upwardly tapered from the first portion 48 to the second portion 50, thereby permitting air to flow up, over and away from the front wall 34 of the trailer 14 when the trailer 14 is being pulled by the truck 12, therefore facilitating the handling of the assembly 10 and maximizing fuel efficiency.

FIG. 5 is a side elevational view of the trailer of FIG. 2 depicting a structural frame of the front section 42 of the trailer 14 in an embodiment of the invention. The frame comprises a lower frame 52, a triangular gusset plate 53, a first, load-bearing upright 54, a triangular plate 55, an upper frame 56, a plurality of second, load-bearing uprights 58, a larinated composite panel structural floor 60, a front stiffener wall 62 and an roof frame 64. Preferably, the frame is made of steel but other materials of equivalent or stronger strength could also be used.

The gusset plate 53 extends diagonally upwards from the lower frame 52 to the first upright 54. The first upright 54 connects the lower frame 52 to a first end of the triangular plate 55. The upper frame 56 is connected to a second end of the triangular plate 55 at a first end of the upper frame 56. A wood/fiberglass finishing wall 65a extends from the lower frame 52 to the upper frame 56. A plurality of second, load-bearing uprights 58 extends upwards from a second end of the upper frame 56. A wood cross-member 65b is fastened between an upper end of the second uprights 58 and an underside of the structural floor 60. An angled wood frame wall 65c extends from the upper frame 56 to the underside of the structural floor 60 to provide for a non-structural finishing wall. A fiberglass lower cap 65d diagonally extends from the upper frame 56 to the underside of the structural floor 60.

The composite panel structural floor 60 is fastened to sidewalls of the trailer as well as fastened to the front stiffener wall 62 and is supported vertically by the second load bearing uprights 58. In a preferred embodiment, the structural floor 60 is comprised of three layers, namely first, upper layer of one layer of ¼ inch thick luan plywood, a second, middle layer of 1.5 inch to 3 inch thick foam insulation and a third, lower layer of either ¼ inch plywood or ⅛ inch luan plywood. The layers are glued together and vacuumed until the glue is set.

Referring to FIG. 6, the pinbox of FIGS. 2 to 4 is illustrated. Pinboxes of this type are well known in the connection of fifth wheel trailer to trucks. The pinbox comprises a trailer portion 66 affixed to the trailer 14 and a pin 68 affixed to the towing bed 18 of the truck 12. The trailer portion 66 is vertically adjustable to various lengths so as to accommodate trucks of various sizes. In this embodiment, the pinbox angle 70 from a horizontal plane 72 to a centre axis of the trailer portion 66 is 72 degrees. However, pinboxes incorporating lesser or greater angles may also be used between the range of 32 degrees to 90 degrees.

An alternate embodiment of the invention is illustrated in FIGS. 7 and 8. In this embodiment, the front section 42 of the trailer 14 extends over the cab 16 of the truck 12 from a first end of the cab 92 closest to the towing bed 20 of the truck 12 to a second end of the cab 94 closest to the hood 18 of the truck 12, thereby extending over substantially the entirety of the cab 16 of the truck 12.

However, it is understood that the front section 42 of the trailer 14, and in particular the second section 46, can be of any length up to a maximum of about the second end 54 of the cab 16. This maximum is due to structural stability of the assembly 10 and dimensional constraints on the range of motion of the truck 12 during grade changes on a road.

For example, in a further embodiment of the invention depicting a shorter front section 42 as shown in FIGS. 9 and 10, the front section 42 of the trailer 14, and in particular the second section 46 of the trailer 14, extends over the towing bed 20 and forward from the first section 44 of the trailer 14 over the first end 92 of the cab 16 but does not extend over a substantial portion of the cab 16 when the trailer 14 is hitched to the truck 12.

FIGS. 11 and 12 illustrate a further embodiment of the invention whereby the trailer 14 is coupled to the truck 12 by a fifth wheel hitch 26. The fifth wheel hitch 26 is, when coupled to the trailer 14 and as shown in FIG. 12, at an angle 96 of approximately 34 degrees relative to the towing bed 20. However, it should be understood that any conventional pin box hitch mechanism can be used providing an angle of about 32 degrees to 90 degrees relative to the towing bed 20.

FIGS. 13 and 14 illustrate a further embodiment of the invention whereby, instead of a rounded front wall 34, the front wall 34 of the trailer 14 tapers outwardly from the first portion 48 of the front wall 34 to a midpoint 98 of the front wall 34 and then the front wall 34 inwardly tapers from the midpoint 98 towards the second portion 50 of the front wall 34. However, it is to be understood that the invention encompasses alternate embodiments of the front wall 34 although fuel efficiency can be increased by employing a front wall 34 which is streamlined and upwardly tapered to allow air flow to easily flow over the front wall 34 of the trailer 14.

FIG. 15 is a floor plan of the front section 42 of the trailer 14 in an embodiment of the invention illustrating the utilization of the front section 42 as bedroom space. The floor plan includes a wardrobe 72, a step 74, a bed frame 76, a mattress 78 and a plurality of nightables 80 on either side of the bed frame 76.

As illustrated in FIG. 16, the composite panel structural floor 60 supports a portion of the bed frame 76 and mattress 78 which extends forward from the pinbox 26.

In a preferred embodiment of the invention, the trailer 14 is approximately 13 feet 6 inches in height and of any length up to the maximum allowed length set by government regulations. The fifth wheel hitch 26 comprises a 72 degree pinbox and an aerodynamic, upwardly tapered design on the front wall 34 of the trailer 14. The length of the front section of the trailer is approximately 1.972 meters from landing gear to pinbox and 1.578 meters from pinbox to front wall. The distance from floor to upper frame is 874 millimeters, from upper frame to structural floor is 695 millimeters and from structural floor to upper frame is 1.457 meters.

Various embodiments of the present invention having been thus described in detail by way of example, variations and modifications will be apparent to those skilled in the art. The invention includes all such variations and modifications as fall within the scope of the appended claims.

The embodiments of the invention in which an exclusive property or privilege is claimed are defined as follows:

1. A fifth wheel trailer for hitching to a truck, the truck having a cab and a fifth wheel hitch in a towing bed of the truck, the improvement comprising a front section of the trailer extending over the cab of the truck when the trailer is coupled to and supported by the fifth wheel hitch.

2. The trailer of claim 1 wherein the front section of the trailer comprises a first section extending over the towing bed of the truck and a second section extending over and forward from the first section, the second section extending over the cab of the truck.

3. The trailer of claim 1 wherein the front section of the trailer comprises:
   a. a lower frame;
   b. an upper frame;
   c. a first upright connecting the lower frame to a first end of the upper frame;
   d. a second upright extending upwards from a second end of the upper frame; and
   e. a floor panel supported by the second, load-bearing upright on one side, a front stiffener wall on a second side and sidewalls on a third and fourth side.

4. The trailer of claim 3 wherein the floor panel is comprised of a plurality of layers comprising a first, upper layer of plywood, a second, middle layer of foam insulation and a third, lower layer of plywood.

5. The trailer of claim 3 further comprising a bed frame which is supported by the floor panel.

6. The trailer of claim 1 wherein the second section of the trailer comprises a front wall, the front wall being upwardly tapered from a first portion closest to the cab of the vehicle to a second portion closest to a roof of the trailer to create a smooth air flow up, over and away from the front end of the trailer.

7. The trailer of claim 1 wherein the front section of the trailer extends over only a portion of the cab of the truck.

8. The trailer of claim 1 wherein the trailer is connected to the truck only by the fifth wheel hitch and is not otherwise supported by the truck.

9. The trailer of claim 1 wherein the front section of the trailer is suitable for sleeping space, living space or storage space.

10. The trailer of claim 1 wherein the fifth wheel hitch is at an angle of 32 degrees to 90 degrees relative to the towing bed when the trailer is coupled to the truck by the fifth wheel hitch.

* * * * *